(12) United States Patent
Mutschler et al.

(10) Patent No.: US 11,882,038 B2
(45) Date of Patent: *Jan. 23, 2024

(54) TRANSACTION ANALYZER FOR COMMUNICATION BUS TRAFFIC

(71) Applicant: SerialTek, LLC, San Jose, CA (US)

(72) Inventors: Paul J. Mutschler, San Jose, CA (US);
Eric Lanning, San Jose, CA (US);
David Nuttall, San Jose, CA (US);
David Freeman, San Jose, CA (US)

(73) Assignee: SerialTek, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,649

(22) Filed: Dec. 1, 2022

(65) Prior Publication Data

US 2023/0089389 A1 Mar. 23, 2023

Related U.S. Application Data

(63) Continuation of application No. 17/025,267, filed on Sep. 18, 2020.

(60) Provisional application No. 62/941,368, filed on Nov. 27, 2019.

(51) Int. Cl.
| | | |
|---|---|---|
| *H04L 47/11* | (2022.01) | |
| *H04L 43/0888* | (2022.01) | |
| *G06F 13/40* | (2006.01) | |
| *G06F 13/42* | (2006.01) | |

(52) U.S. Cl.
CPC ............ *H04L 47/11* (2013.01); *G06F 13/404* (2013.01); *G06F 13/4221* (2013.01); *G06F 13/4295* (2013.01); *H04L 43/0888* (2013.01); *G06F 2213/0026* (2013.01)

(58) Field of Classification Search
None
See application file for complete search history.

(56) References Cited

U.S. PATENT DOCUMENTS 10,860,511 B1 * 12/2020 Thompson .............. G06F 13/28
2004/0039892 A1    2/2004  Goldschmidt
(Continued)

FOREIGN PATENT DOCUMENTS

WO    WO2014206356    *  6/2014

OTHER PUBLICATIONS

Minturn. "Under the Hood with NVMe over Fabrics." SNIA Ethernet Storage Forum. Dec. 15, 2015 (Year: 2015).*

*Primary Examiner* — Andre Tacdiran (57) ABSTRACT

Various data bus monitoring, analysis, and logging systems, devices, and methods are described herein. In one example, an apparatus includes a first circuit configured to monitor first packets among traffic carried by one or more first directional lanes of a communication link established between a host and one or more endpoint devices and determine header information for the first packets. The apparatus includes a second circuit configured to detect second packets among traffic carried by one or more second directional lanes of the communication link based at least in part on the header information determined for the first packets. The apparatus includes an analysis element configured to establish transaction metadata comprising properties of transactions on the communication link based at least on correlations among the first packets and the second packets.

22 Claims, 5 Drawing Sheets

(56) References Cited

U.S. PATENT DOCUMENTS

| | | | |
|---|---|---|---|
| 2005/0216638 A1* | 9/2005 | Smith | G06F 13/4265 |
| | | | 710/305 |
| 2008/0162865 A1* | 7/2008 | Koufaty | G06F 12/1483 |
| | | | 711/173 |
| 2009/0164694 A1* | 6/2009 | Talayco | G06F 13/4022 |
| | | | 710/316 |
| 2011/0202703 A1 | 8/2011 | Bacher et al. | |
| 2012/0047309 A1* | 2/2012 | Natu | G06F 13/4027 |
| | | | 710/314 |
| 2012/0124252 A1 | 5/2012 | Kayama | |
| 2013/0086288 A1* | 4/2013 | Lakshmanamurthy | |
| | | | G06F 13/364 |
| | | | 710/113 |
| 2016/0380861 A1* | 12/2016 | Ali | H04L 43/026 |
| | | | 709/224 |
| 2018/0321964 A1* | 11/2018 | Tsuji | G06F 9/45558 |
| 2020/0019433 A1* | 1/2020 | Qiu | G06F 9/4831 |
| 2020/0042246 A1 | 2/2020 | Maharana et al. | |
| 2020/0081858 A1* | 3/2020 | Philmore | G06F 13/4027 |
| 2020/0356396 A1 | 11/2020 | Bert | |
| 2021/0049101 A1 | 2/2021 | Ray et al. | |

* cited by examiner

```c
typedef volatile struct tagHBA_MEM
{                                                                          300
    // 0x00 - 0x2B, Generic Host Control
    DWORD   cap;                // 0x00, Host capability
    DWORD   ghc;                // 0x04, Global host control
    DWORD   is;                 // 0x08, Interrupt status
    DWORD   pi;                 // 0x0C, Port implemented
    DWORD   vs;                 // 0x10, Version
    DWORD   ccc_ctl;            // 0x14, Command completion coalescing control
    DWORD   ccc_pts;            // 0x18, Command completion coalescing ports
    DWORD   em_loc;             // 0x1C, Enclosure management location
    DWORD   em_ctl;             // 0x20, Enclosure management control
    DWORD   cap2;               // 0x24, Host capabilities extended
    DWORD   bohc;               // 0x28, BIOS/OS handoff control and status
    BYTE    rsv[0xA0-0x2C];     // 0x2C - 0x9F, Reserved
    BYTE    vendor[0x100-0xA0]; // 0xA0 - 0xFF, Vendor specific registers
                                // 0x100 - 0x10FF, Port control registers
    HBA_PORT    ports[1];       // 1 ~ 32
} HBA_MEM;

typedef volatile struct tagHBA_PORT
{
    DWORD   clb;    // 0x00, command list base address, 1K-byte aligned
    DWORD   clbu;   // 0x04, command list base address upper 32 bits
    DWORD   fb;     // 0x08, FIS base address, 256-byte aligned
    DWORD   fbu;    // 0x0C, FIS base address upper 32 bits
    DWORD   is;     // 0x10, interrupt status
    DWORD   ie;     // 0x14, interrupt enable
    DWORD   cmd;    // 0x18, command and status
    DWORD   rsv0;   // 0x1C, Reserved
    DWORD   tfd;    // 0x20, task file data
    DWORD   sig;    // 0x24, signature
    DWORD   ssts;   // 0x28, SATA status (SCR0:SStatus)
    DWORD   sctl;   // 0x2C, SATA control (SCR2:SControl)
    DWORD   serr;   // 0x30, SATA error (SCR1:SError)
    DWORD   sact;   // 0x34, SATA active (SCR3:SActive)
    DWORD   ci;     // 0x38, command issue
    DWORD   sntf;   // 0x3C, SATA notification (SCR4:SNotification)
    DWORD   fbs;    // 0x40, FIS-based switch control
    DWORD   rsv1[11]; // 0x44 ~ 0x6F, Reserved
    DWORD   vendor[4]; // 0x70 ~ 0x7F, vendor specific
} HBA_PORT;
```

FIGURE 3

TRANSACTION ANALYZER FOR COMMUNICATION BUS TRAFFIC

RELATED APPLICATIONS

This application is a continuation of, and claims priority to, U.S. patent application Ser. No. 17/025,267, entitled "TRANSACTION ANALYZER FOR PERIPHERAL BUS TRAFFIC," and filed Sep. 18, 2020. This application hereby claims the benefit of and priority to U.S. Provisional Patent Application 62/941,368, titled "TRANSACTION ANALYZER FOR PERIPHERAL BUS TRAFFIC," filed Nov. 27, 2019, which is hereby incorporated by reference in its entirety.

BACKGROUND

Various expansion bus architectures have been employed in computing systems to couple peripherals and devices with main processors (referred to herein as hosts). One such architecture includes Peripheral Component Interconnect Express (PCIe), which itself is a successor to several earlier bus architectures. PCIe employs a point-to-point physical link architecture for coupling devices and hosts over high-speed serial interfaces. NVM Express (NVMe) or Non-Volatile Memory Host Controller Interface Specification (NVMHCIS) interfaces can be employed on top of PCIe links to couple hosts to non-volatile data storage devices, such as solid-state drives (SSDs).

When various PCIe or NVMe devices first start to communicate with a host, initialization information is exchanged that makes further communications possible between the host and the devices. Example initialization information includes information related to capabilities supported by a corresponding PCIe bus controller of the host. This initialization information can be indicated in a Controller Capabilities (CAP) register and as part of the Controller and Namespace data structures returned in Identify commands during initialization. An Identify Controller data structure indicates capabilities and settings that apply to the entire PCIe controller, whereas an Identify Namespace data structure indicates capabilities and settings that are specific to a particular PCIe namespace which is a subset of the entire PCIe controller. This initialization information is typically exchanged at device power-up when a device first begins to communicate with a host. However, if a bus monitoring device does not capture this startup process, it can be difficult to later obtain the initialization information as well as decode further communications exchanged between the host and devices.

Overview

Various data bus monitoring, analysis, and logging systems, devices, and methods are described herein. In one example, an apparatus includes a first circuit configured to monitor first packets among traffic carried by one or more first directional lanes of a communication link established between a host and one or more endpoint devices and determine header information for the first packets. The apparatus includes a second circuit configured to detect second packets among traffic carried by one or more second directional lanes of the communication link based at least in part on the header information determined for the first packets. The apparatus includes an analysis element configured to establish transaction metadata comprising properties of transactions on the communication link based at least on correlations among the first packets and the second packets.

In another example, a method includes monitoring first packets among traffic carried by one or more first directional lanes of a peripheral component interconnect express (PCIe) communication link established between a host and one or more endpoint devices and determine header information for the first packets, wherein the header information determined for the first packets comprises bus-device-function (BDF) properties. The method includes detecting second packets among traffic carried by one or more second directional lanes of the PCIe communication link based at least in part on the header information determined for the first packets, and establishing transaction metadata comprising properties of transactions on the PCIe communication link based at least on correlations among the first packets and the second packets, wherein the transaction metadata comprises transaction tags organizing individual transactions monitored on the communication link along with associated endpoint addresses, transaction types, and the BDF properties.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 3 illustrates a table indicating example data structures.

DETAILED DESCRIPTION

Computer systems and data processing/storage systems can take the form of personal computers, servers, rackmount equipment, and other similar equipment examples. Many of these systems include various data buses which can couple processing elements, data storage elements, and peripheral elements for communication, control, and user input. One such computer bus includes the Peripheral Component Interconnect Express (PCIe) bus which is a point-to-point high-speed serial communication framework. PCIe can be used to couple host devices to endpoint devices over one or more physical communication lanes that carry the serial communications. Various higher-level protocols can be transported over PCIe, such as NVMe which is used primarily for storage device endpoints. Other point-to-point interfaces might instead be employed, such as AHCI (Advance Host Controller Interface) for serial ATA (SATA). Development, design, and debug of computing systems and devices which employ PCIe or other interfaces can prove difficult due to the high-speed nature of the interfaces as well as when many endpoint devices share a common link provided by one or more port multipliers, bridges, fan-out elements, or switch circuits.

Various signal analyzers and logic analyzers have been developed to monitor or scan traffic which is transported over targeted PCIe links, and act as PCIe bus monitoring devices. While these bus monitoring devices can provide some insight into traffic carried by the targeted PCIe links, many of these bus monitoring devices require monitoring of a power-on or boot-up processes of hosts to which the targeted devices are coupled to determine various properties of the targeted devices. When such bus monitoring devices do not capture this startup process, it can be difficult to later obtain device initialization information as well as decode further communications exchanged between the host and endpoint devices.

Figure 1:
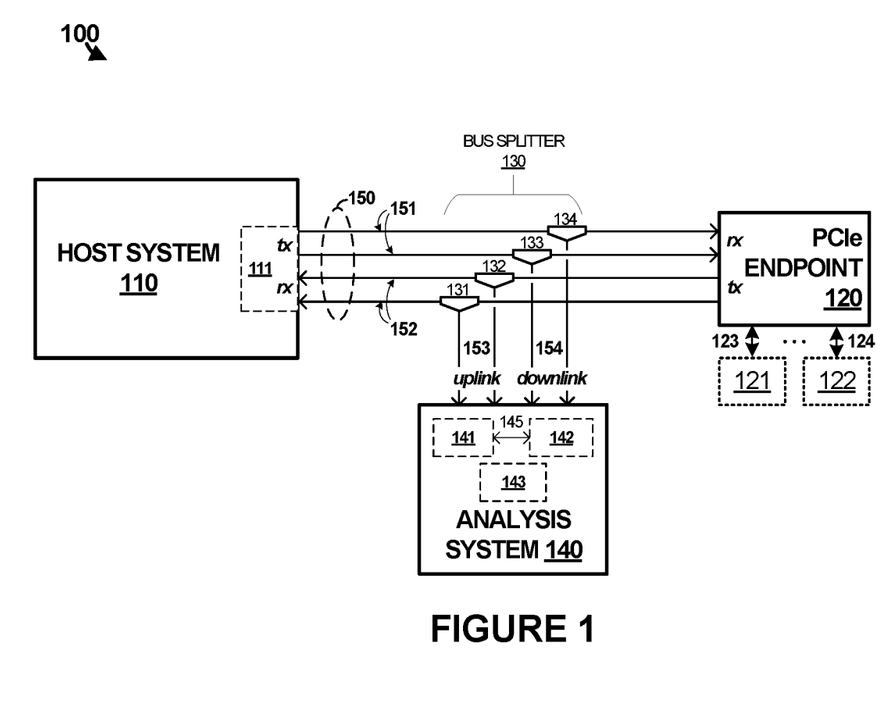
FIG. 1 illustrates a computing system in an implementation.

FIG. 1 is presented to illustrate system 100 comprising enhanced bus monitoring and analysis elements. System 100 includes host system 110, endpoint devices 120-122, bus splitter 130, and analysis system 140. In FIG. 1, a computing system is presented which includes host system 110 and one or more endpoint devices 120-122. Host system 110 comprises a system processor or processing system which includes PCIe root complex 111. The one or more endpoints can include peripheral devices, storage devices, or other PCIe devices. Other examples might have endpoint device 120 instead included as one or more PCIe switch circuits and further endpoint devices 121-122 coupled via links 123-124 to the PCIe switch circuit(s). Analysis system 140 in combination with splitter 130 are then configured to monitor traffic carried over at least communication link 150. Analysis system 140 can be employed to store or present information related to the traffic or perform various traffic analysis.

Host system 110 and endpoint device 120 are communicatively coupled over communication link 150. Communication link 150 can comprise a point-to-point serial link, such as PCIe or other high-speed serial point-to-point communication buses. Communication link 150 includes one set of 'lanes' in FIG. 1. This lane set comprises a bidirectional communication link having two unidirectional lanes formed by differential signal pairs. Although only one lane set is shown in FIG. 1 for clarity, more lane sets can instead be included between host system 110 and endpoint device 120, with added lane sets typically providing further bandwidth for communications transferred over communication link 150. Communication link 150 includes first directional lanes 151 and second directional lanes 152. These directional lanes 151-152 can be referred to as uplink or downlink portions, among other designations. The directionality of each of directional lanes 151-152 is indicated in FIG. 1 by a transmit (tx) and receive (rx) label for each of host system 110 and endpoint device 120.

Bus splitter 130 couples to each differential signal of communication link 150 via corresponding analog splitters 131-134. Analog splitters 131-134 provide a signal copy or replicated link without interfering with the signaling carried by communication link 150. Thus, host system 110 and endpoint device 120 are typically not aware of the presence of bus splitter 130 on communication link 130. Analog splitters 131-134 would typically have a high input impedance so as to not draw disrupting currents from each associated physical link. One or more among analog splitters 131-134 might be combined into differential signal amplifiers or differential signal splitters in some configurations. Bus splitter 130 can also comprise various physical mounting elements which couple to connectors, sockets, edge connectors, cabling, and other various mechanical interfacing elements to couple between host system 110 and endpoint device 120.

Bus splitter 130 provides monitoring links 153-154 to analysis system 140. Monitoring links 153-154 might comprise replicated links that replicate physical signaling of links 151-152. Monitoring links 153-154 might comprise buffered versions of links 151-152 or single-ended versions of links 151-152, with one or more converted signal levels. In some examples, bus splitter 130 includes analog-to-digital conversion circuitry to provide digitized versions of analog signals carried by communication link 150. These digitized signals can provide for monitoring or determining analog properties of the signals carried over link 150 which can be employed in signal integrity analysis or signal tracing activities.

Analysis system 140 is configured to receive signals presented on links 153-154 for monitoring, logging, storage, and analysis of traffic carried by communication link 150. Analysis system 140 can include various circuitry, logic, processing elements, memory elements, storage elements, and communication interfaces. In one example, analysis system comprises a bifurcated configuration having first circuit 141 configured to interface with link 153 and second circuit 142 configured to interface with link 154. First circuit 141 and second circuit 142 can comprise separate processors, field-programmable gate arrays (FPGAs), application specific integrated circuits (ASICs), discrete logic, or other elements. When the bifurcated configuration is employed, then first circuit 141 and second circuit 142 can communicate over one or more discrete links indicated by link 145 in FIG. 1. An additional analysis element 143 can be included which receives information and indicators related to the traffic monitored and detected by circuits 141-142. Analysis element 143 can perform various protocol analysis and signal analysis functions, as well as log or store information about traffic carried by link 150. Various storage elements might be included in circuit 141-142 or external to circuits 141-142 for holding information related to the traffic. In some examples, additional dynamic random access memory (DRAM) is included in addition to block RAM which might be provided by FPGA circuitry. Further examples of analysis system 140 are included in FIGS. 4 and 5 below.

As mention above, communication link 150 can comprise a PCIe link. PCIe links can support multiple bus widths, such as x1, x2, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. Although PCIe is used in FIG. 1, it should be understood that different communication links or busses can instead be employed, such as Ethernet, Serial Attached SCSI (SAS), FibreChannel, Thunderbolt, Serial Attached ATA Express (SATA), or SATA Express, among other interconnect, network, and link interfaces. Communication link 150 can use various communication media, such as metal or optical fiber, or some other signal propagation path, including combinations thereof. Communication link 150 can include any number of PCIe links or lane configurations. Communication link 150 can be a direct link or might include various equipment, intermediate components, systems, and networks. Communication link 150 can be a common link, shared link, aggregated link, or may be comprised of discrete, separate links.

Figure 2:
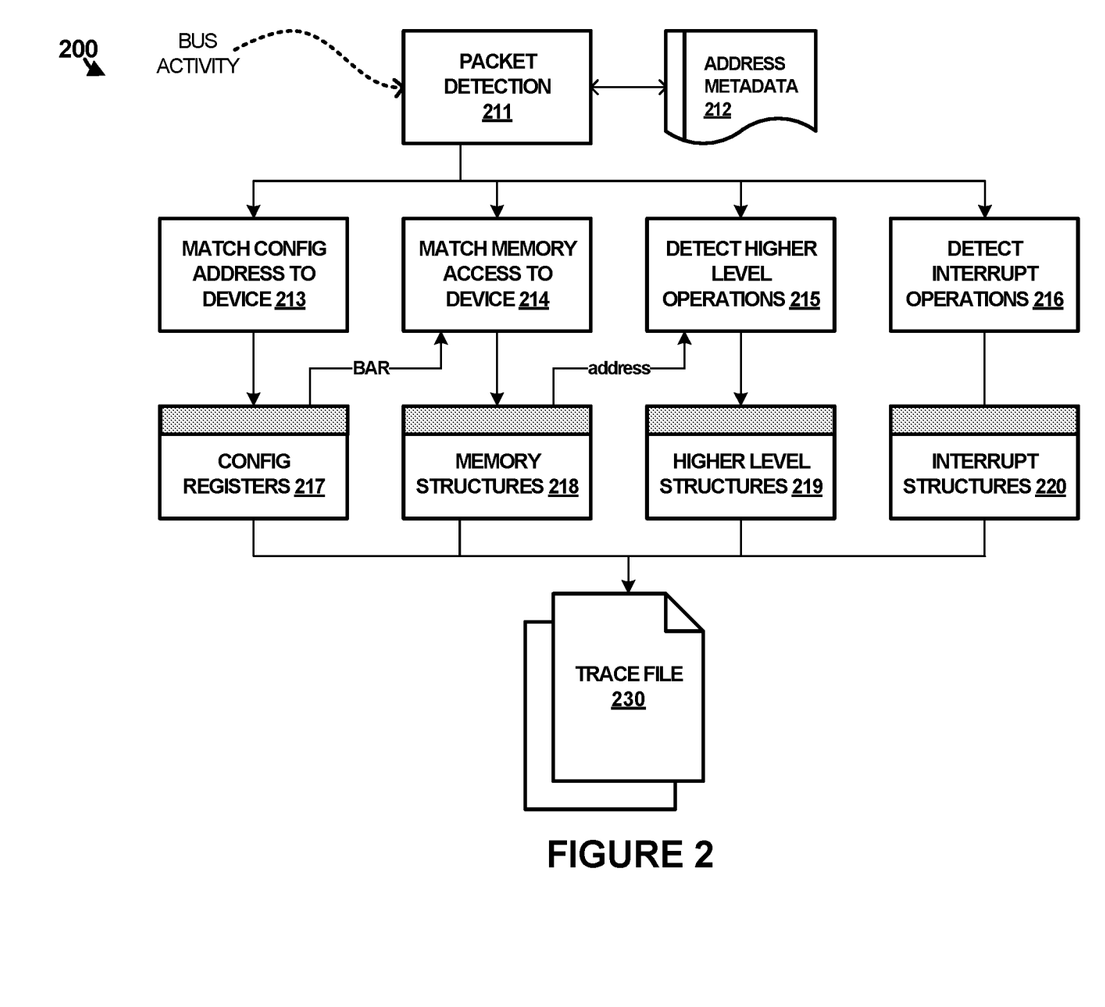
FIG. 2 illustrates transaction monitoring operations in an implementation.

FIG. 2 is presented to illustrate example operations 200 of elements of FIG. 1. Specifically, FIG. 2 illustrates operations of analysis system 140 which monitors traffic carried by communication link 150. As mentioned in FIG. 1, links 151-152 are replicated onto links 153-154 by bus splitter 130. Thus, via links 153-154, analysis system 140 can monitor actual traffic carried over communication link 150. Bus activity is monitored by analysis system 140 to detect packets indicated over links 153-154. These packets can be monitored as frames transferred over a PCIe physical of one or more among links 153-154.

From these frames, packets can be assembled and detected in packet detection operation 211. The packets will have various structural portions, such as headers and payloads, among other portions. Within the header portions, various addressing information, and other protocol-specific information is included. For example, analysis system 140 can determine header information for packets that comprises bus-device-function (BDF) properties, sometimes referred to as a requester identifier (ID) or completer ID. A bus comprises a collection of PCIe devices that share a common PCIe bus number, which is a logical grouping of devices defined by the PCIe specification. A device comprises a collection of one or more PCIe functions, and has a corresponding device ID. Devices typically refer to discrete physical components that couple to a PCIe bus, such as storage drives. Finally, a function comprises an addressable portion of a device which can be configured using an assigned configuration space. Together, a particular transaction on the PCIe bus will be directed using BDF properties, and addressing can be employed within an address space assigned to each device or function. This information, as noted above, is carried by headers of some PCIe packets.

In PCIe architectures, transactions can be divided over transmit (tx) and receive (rx) lanes of a link. A requester can initiate a transaction with another entity on the PCIe bus, and a completer can handle the transaction according to the type of transactions(s). In one example, root complex 111 or host system 110 can initiate a transaction to endpoint device 120. In such an example, the host system would be considered the requester and the endpoint device would be considered the completer. Other configurations and roles can be established, which may vary based on each transaction and type of transaction. In FIG. 1, links 153 are labeled as uplink and links 154 are labeled as downlink. These labels are from the perspective of host system 110, where the downlink corresponds to lanes 151 (tx for host system 110) and the uplink corresponds to lanes 152 (rx for host system 110). Thus, first circuit 141 interfaces with uplink lanes 153, while second circuit 142 interface with downlink lanes 154. Packets which are transferred over link 152 are monitored/detected by first circuit 141, and packets which are transferred over link 151 are monitored/detected by second circuit 142.

The various types of transactions can be defined by the PCIe specification, but typically include memory read/write packets, configuration read/write packets, interrupt signaling packets, and input/output (I/O) read/write packets. Also, various acknowledgement (ACK) packets or completion packets can be transferred in response to packets which initiate the aforementioned transaction types. Each transaction type will have a corresponding property indicated in packet headers of packets that initiate the transaction. These properties can be detected to determine the transaction type, along with other packet properties. In addition, a sequence indicator or sequence number can be employed in the packet headers to indicate ordering among packets or transactions transferred between PCIe entities.

In FIG. 1, first circuit 141 and second circuit 142 provide for monitoring of both sides of a transaction which occurs over a different set of lanes. First packets of a transaction can be issued by a requester and received by a completer. Second packets of the transaction can be issued by a completer and received by the requester. The first packets can initiate a transaction, while the second packets can be a mere acknowledgement or can provide a response warranted by the transaction type. For example, a write transaction might have write data provided in first packets from a requester, and then the completer will complete the write transaction and provide an acknowledgement back to the requester in one or more second packets. In contrast, a read transaction can include first packets transferred by the requester with a read instruction followed by read data provided in second packets by the completer.

Advantageously, since both sides of lane directionality of the PCIe bus are monitored, first/second packets for each side of a transaction can be correlated together among requester-completer pairs, and transactions can be more effectively monitored. In FIG. 1, analysis element 143 can perform this correlation and further monitoring functions that employ both sides of a transaction. This monitoring of both sides of a transaction can lead to more effective monitoring by detecting when transactions complete in time relative to initiation, detecting when completions, responses, or acknowledgements happen correctly or are missing, detect when read data is provided back to requesters, and detect other various behavior of host systems and endpoint devices.

Returning to FIG. 2, four transaction types are shown as able to be detected/monitored by analysis system 140. In operation 213, configuration read/write transactions are detected, and addressing employed in the associated packets can be matched to particular endpoint devices. In operation 214, memory read/write access transactions are detected, and addressing employed in the associated packets can be matched to particular endpoint devices. In operation 215, higher-level protocol operation transactions are detected, and addressing or other transaction properties employed in the associated packets can be matched to particular endpoint devices. In operation 216, interrupt signaling transactions are detected, and addressing or other transaction properties employed in the associated packets can be matched to particular endpoint devices.

Analysis system 140 can determine at least transaction types for the transactions based at least in part on the header information determined for first packets monitored/detected on downlink 154 and second packets monitored/detected on uplink 153. Analysis system 140 can trigger one or more analysis or logging operations for the transactions based on the transaction types. Based on the transaction types indicating configuration transactions, analysis system 140 can establish configuration data structures 217 comprising at least a partially replicated configuration space or configuration registers. These configuration registers in configuration data structures 217 can indicate capabilities and base address ranges of one or more endpoint device based on one or more configuration transactions detected using the correlations among the first packets and the second packets. Base address register (BAR) properties established using configuration transactions, such as device starting addresses, address ranges, and the like, can be provided/retrieved for elements that perform operation 214 which use the BAR properties to detect or match memory access transactions to particular endpoint devices.

When the transactions comprise memory access read/write transactions, such as detected in operation 214, then memory data structures 218 can be established which indicate structures of the memory spaces for the associated devices. These memory structures 218 can indicate BAR information, address ranges, or memory status properties such as fullness. In some examples, device debug or monitoring process might warrant storing payload data which is written to or read from a device, which can be stored in memory structures 218. Also, addressing information for transactions and devices might be provided/retrieved for elements that perform operation 215 to detect and monitor higher-level operations.

When transaction types indicate higher-level transactions, analysis system 140 detect properties of the high-level transactions and store information related to these transactions in higher-level data structures 219. These higher-level operations might be specific to a particular device, such as specialized operations performed by particular functions within a device. In one example, the device might comprise a storage device, and the high-level operations might comprise data read/write/erase operations defined by a storage protocol that rides on top of the underlying PCIe protocol. One such storage protocol comprises NVMe, and transactions which employ NVMe commands can be detected/monitored in operation 215. Other protocols and higher-level operations which operate on top of the underlying PCIe signaling or protocols can be detected and monitored by operation 215 using addressing provided by operation 218. Data structures 219 can be established to monitor or store transaction histories of these high-level operations.

When transaction types indicate interrupt transactions, analysis system 140 can establish in operation 216 at least partially replicated interrupt address spaces of the one or more endpoint device based on one or more interrupt transactions detected using the correlations among the first packets and the second packets. Furthermore, interrupt signaling can be detected and relative timing among interrupt requests and responses can be monitored in operation 216. These interrupt address spaces and other interrupt status information can be stored in one or more interrupt data structures 220.

All of the various information monitored, stored, or replicated by operations 213-216 and contained within data structures 217-220 can be assembled, at least in part, into one or more trace files 230. These trace files can comprise composite log files, structured data files, raw data collections, or other various formats which are provided to users or user interfaces for further analysis and debug operations provided by analysis system 140 for host system 110, endpoint device 120, and communication link 150. Analysis system 140 might comprise one or more network interfaces which can transfer the trace files for storage onto various network connected storage devices, or might allow users/operators to access the trace files over a network interface when the trace files are stored by analysis system 140. Moreover, various user interfaces can be presented by analysis system 140 which make use of the data contained in the trace files, which can comprise transaction histories, transaction timing information, endpoint device status, host system status, or other various information.

In addition to analysis system 140 detecting particular transaction types and monitoring properties of the transactions, transaction metadata 212 comprising one or more data structures can be determined and leveraged for selected transactions/packets. Metadata 212 comprises properties of transactions monitored on communication link 150 based at least on correlations among first packets monitored/detected on downlink 154 and second packets monitored/detected on uplink 153. Metadata 212 might comprise traffic or transaction history organized by transaction identifiers, where the transaction identifiers allow properties or information related to first/second packets (e.g. transmitted and received packets) for each transaction to be organized together. Metadata 212 might comprise traffic history organized by these transaction identifiers that establish the at least partially replicated interrupt address space, configuration space, or memory space structural information.

Analysis system 140 can be configured to determine endpoint addresses associated with transactions based at least on correlations among the first packets and the second packets (e.g. transmitted and received packets), and can be configured to establish metadata 212 as comprising transaction tags organizing individual transactions monitored on communication link 150 along with associated endpoint addresses, transaction types, and BDF properties. Analysis system 140 can be configured to establish one or more traffic filters based on the transaction tags and provide indications of the one or more traffic filters for filtering portions of the traffic carried by the one or more second directional lanes in accordance with BDF properties specified by the one or more traffic filters. The filtering portions of the traffic typically comprises capturing information for first traffic having targeted BDF properties and ignoring second traffic having un-targeted BDF properties, or capturing information for first traffic associated with a designated endpoint device and ignoring second traffic associated with undesignated endpoint devices.

Metadata 212 can be used to establish traffic filters for a portion of the lanes of communication link 150. For example, the transaction tags can be established by analysis element 143 based on information detected/monitored by first circuit 141. Filtering information can be provided by analysis element 143 to second circuit 142 for filtering of traffic monitored by second circuit 142. Thus, a portion of the traffic monitored by second circuit 142 can be ignored using the filters, and only traffic which meets criteria established by the filtering information can have properties captured/monitored by second circuit 142. A similar operation for filtering traffic monitored by first circuit 141 can be established based on traffic properties determined by lanes monitored by second circuit 142. Advantageously, when large amounts of traffic are carried by communication link 150, only a relevant portion need be monitored and stored. This can reduce the memory requirements, increase detection of errors or triggered events, and provide a better user interface experience for users to sift through the vast amount of traffic which might be carried over communication link 150. This can be especially true when endpoint device is coupled through one or more switching elements, such as PCIe switch circuits, which can also lead to communication link 150 carrying traffic for many devices.

Turning now to an example discussion on a specific type of monitoring performed by analysis system 140, operations detailing capture of configuration registers of an endpoint device is discussed. The configuration shown in FIG. 1 can automatically capture configuration registers and queue addresses without capturing a start-up process for the host system or endpoint device. The following described method advantageously allows the traffic carried on communication link 150 to be understood by analysis system 140 or an associated user without capturing power-up or start-up. In other systems, if one misses this startup process, it might be difficult to understand and decode the conversations between host systems and endpoint devices. The methods described below overcome this problem not only for PCIe and NVMe, but for other point-to-point protocols that communicate between host systems and endpoint devices. To get around the problem of having to be actively capturing bus traffic at power-up or start-up, special data structures are employed by analysis system 140 that automate the gathering of the traffic information manually entered as well as additional information automatically captured from communication link 150. One example implementation is a method for understanding an NVMe configuration when startup communications are not present or not monitored. In this case, data that may have been entered manually along with the data analysis system 140 captured in data structures that can be used to decode the traffic on the bus. By understanding these data structures, along with other structures defined in the AHCI specification, the example implementation can analyze the data without having to listen to the initial communication during start-up.

In analyzing the communications between host system 110 and endpoint device 120, the configuration information typically needs to be understood by analysis system 140. Furthermore, other downstream software and hardware that analyzes bus data beyond analysis system 140 relies upon the capturing of the configuration information. In the general case, by capturing and storing communications that are on the bus and then decoding the communications based on the specification for that form of communication, this example implementation will be able to understand and analyze bus communications without having to capture the initial communications. The process for collecting configuration data when startup is not captured includes the following example operations. First, analysis system 140 can store configuration space registers and queue addresses without capturing start-up in the trace. Second, analysis system 140 can store registers and/or addresses of higher level protocols on top of any protocol seen on the bus. Third, analysis system 140 can store registers and/or addresses of higher level protocols on top of the PCIe protocol. This provides for creation of archives such as data structures, metadata, or trace files, on-the-fly after start-up based on what is monitored on the bus, and storing of configuration data for devices without capturing start-up processes of the bus.

The archives are used to precapture-filter and trigger on higher level protocol events, calculate timespans where a particular address has particular meaning, display locations of these events in a view presented in a user interface, decode higher level protocols based on the address mapping, direct hardware (such as first circuit 141 and second circuit 142) on what the hardware should look for on the bus. For example, what devices to discover, what devices to manually add, and queues for traffic decode.

In another example, in NVMe, the lower 64 bytes of configuration space for 32 functions and the lower 64 bytes of memory space (BAR 0/1) for 32 functions can be stored in the archive. Other items can be stored in the archive, such as the create or delete queue commands issued since power-on or queue wipe for 32 functions. Furthermore, all data needed to understand the device configuration can be stored. Example data includes bus configuration registers for one or more devices, device configuration registers for one or more devices, and addresses of import memory structures and their function for those devices. This gives monitoring hardware or software the information appropriate to identify and decode the events of 32 or more devices. For NVMe devices, this information can include NVMe controller register accesses, doorbell register writes, command transfers, completion transfers, and interrupts, among other information. User-entered controller address settings, if present such as in NVMe, can override the information in the archive if the BARs match. But, since these sets of settings are separate structures, a user can delete the manual settings at any time to revert to the automatically gathered archives. However, normal use cases will entail transparent decoding of traffic. In more rare circumstances a user would want to enable and enter controller settings manually. When users add device settings manually, new traffic for those devices can be decoded using the user-defined service settings along with any existing traffic in the archives.

In addition to the PCIe and NVMe interfaces and protocols discussed above, another example interface and protocol is AHCI (Advance Host Controller Interface) for the "Serial AT Attachment" (SATA) interface. An AHCI controller may support up to 32 ports which can attach to different SATA devices such as disk drives, port multipliers, or an enclosure management bridge. AHCI also supports all SATA features such as command queueing, hot plugging, power management, and the like. Information related to these features are exchanged between a host system and a device when a powered up SATA device is first connected to an associated communication bus, or when the SATA device is powered up after being connected to the bus. Without the enhanced examples discussed herein, if a monitoring system missed this initial communication, the monitoring system might not be able to completely understand the rest of the information exchanged between a host system and a device. Example code set out in table 300 in FIG. 3 which defines memory structures in the Serial ATA Revision 3.0 specification. The information related to these structures and many other structures are exchanged when the device and host system first communicate. Information similar to that of table 300 can be exchanged for other protocols and interfaces, which is tailored to those specific protocols/interfaces.

Figure 4:
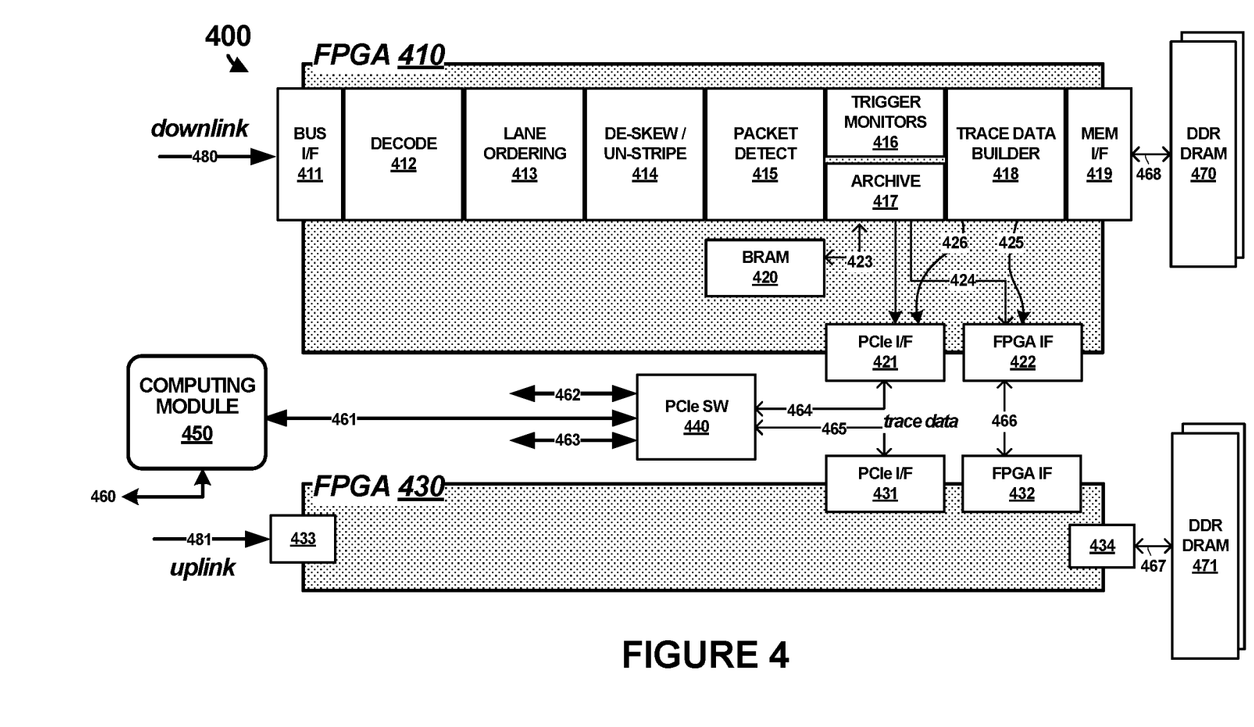
FIG. 4 illustrates a monitor system in an implementation.

FIG. 4 illustrates monitor system 400 in an implementation. Monitor system 400 comprises two field-programmable gate arrays (FPGAs) 410 and 430. In addition to FPGAs 410 and 430, FIG. 4 includes PCIe switch 440, computing module 450, and double-data rate dynamic random access memory (DDR DRAM) 470-471. FPGA 410 and FPGA 430 communicate over link 466, which might comprise various proprietary or standardized links. FPGA 410 and DDR DRAM 470 communicate over link 468. FPGA 430 and DDR DRAM 471 communicate over link 467. FPGA 410 and PCIe switch 440 communicate over PCIe link 464. FPGA 430 and PCIe switch 440 communicate over PCIe link 465. PCIe switch 440 and computing module 450 communicate over PCIe link 461. Computing module 450 can communicate with one or more external systems, networks, or devices over link 460.

A first FPGA 410 is coupled to one or more first lanes of a communication bus over link 480, referred to as a downlink portion. A second FPGA 430 is coupled to one or more second lanes of a communication bus over link 481, referred to as an uplink portion. The communication bus might include a single lane or multi-lane PCIe bus, among others, comprising one or more uplink lanes and one or more downlink lanes. Various link interfacing circuitry, such as signal or bus splitters can be included (omitted from FIG. 4 for clarity), and these signal splitters would typically provide electrically buffered replicas or versions of monitored signal links over links 480-481. This two FPGA arrangement of FIG. 4 provides for separate circuitry for downlink/uplink portions of a bus, but other examples might include a unified FPGA or combined logic/circuitry, processors, or ASICs to monitor both downlink and uplink portions.

FPGA 410 includes several partitioned logic elements including bus interface 411, decode 412, lane ordering 413, de-skew/un-stripe 414, packet detect 415, trigger monitors 416, archive 417, trace data handler 418, memory interface 419, PCIe interface 421, FPGA interface 422, and block RAM (BRAM) 420. The components of FPGA 410 and 430 can be similar in structure, but may differ in function or implementation. For the purposes of clarity, the discussion in FIG. 4 will consider similar components included in FPGA 410 and 430. However, some elements of FPGA 430 are shown in a reduced level of detail for clarity. The components of FPGA 430 shown include interfacing components comprising PCIe interface 431, FPGA interface 432, bus interface 433, and memory interface 434.

Computing module 450 is configured to receive information over link 461 from FPGA 410 or FPGA 430 for monitoring, logging, storage, and analysis of traffic carried by the monitored communication bus. Computing module 450 can include various circuitry, logic, processing elements, memory elements, storage elements, and communication interfaces. Computing module 450 can comprise one or more microprocessors, microcontrollers, field-programmable gate arrays (FPGAs), application specific integrated circuits (ASICs), discrete logic, or other elements. Computing module 450 can be implemented within a single processing device but can also be distributed across multiple processing devices or sub-systems that cooperate in executing program instructions. Examples of computing module 450 include general purpose central processing units, application specific processors, and logic devices, as well as any other type of discrete circuitry, control logic, or processing device, including combinations, or variations thereof. Computing module 450 includes one or more PCIe interfaces for communication over link 461, and one or more network interfaces for communicating over link 460.

PCIe switch circuitry 440 comprises one or more PCIe crosspoint switches, which logically interconnect various ones of PCIe links 461-465 based at least on the traffic carried by each PCIe link. Each PCIe switch port can comprise a non-transparent (NT) or transparent port, or a logical domain-segregated port. An NT port can allow some logical isolation between endpoints, while a transparent port does not allow logical isolation, and has the effect of connecting endpoints in a purely switched configuration. Domain-based PCIe segregation can allow segregation of PCIe ports of a PCIe switch according to user-defined logical groups.

Turning now to a detailed discussion on the elements of FPGA 410, a functional and structural description is presented. Bus interface 411 comprises PCIe interface circuitry, such as transceivers, buffers, I/O pads, and the like for communicating over a PCIe interface. Typically, bus interface 411 will only have receiver circuitry to monitor signals presented on link 480, but some examples might also include transmitter circuitry. When bus interface 411 couples to PCIe links, then bus interface 411 translates low-voltage differential signaling into single-ended electrical signals compatible with internal logic of FPGA 410. Bus interface 433 of FPGA 430 can operate in a similar manner and comprise similar elements with respect to link 481.

Bus interface 411 then provides the converted signals to further signal and bit processing elements. These elements operate at a physical layer and data link layer to convert a serial bitstream into a parallel set of bits and remove link layer encoding or bit scrambling to recreate the original transport layer packet formatting employed by the transmitting device or host. Elements 412-414 can comprise portions of FPGA 410 that handle a layer-1 (physical layer) and layer-2 (data link layer) of a particular communication link and protocol. Once this processing in elements 412-414 is complete, then packet detect element 415 can being processing of packets carried by the link.

Specifically, decode element 412 comprises logic circuitry to perform de-scrambling of encoded signals that are received by bus interface 411 in accordance with the physical data link employed by link 480. These encoded signals comprise serialized bitstream signaling which has a binary polynomial applied, and this signal are de-scrambled and converted into a usable format. Decode element 412 then provides the decoded signals to lane ordering element 413. Lane ordering element 413 comprises logic circuitry to properly order signals carried by lanes of the communication link according to the particulars of the protocol carried by the link. For example, one or more PCIe lanes might be employed which transfers data among the one or more lanes in a serial fashion. Lane ordering element 413 can determine reversed or incorrect connections among one or more lanes, and place the signaling into a more orderly format. Furthermore, de-skew/un-stripe element 414 comprises logic circuitry to provide further processing on the bitstreams transferred across individual lanes, such as when individual lanes vary slightly in timing or signal phases. Un-striping can take one or more serial bitstreams and convert into a parallel arrangement ready for interpretation at a layer 3 or transmission layer.

Packet detect element 415 detects Transaction Layer Packets (TLPs) which are layer-3 packets (transaction layer). The packets will comprise at least a header portion and a payload portion. The header portion contains one or more fields which are defined according to the particular protocol and indicate characteristics or properties of the packet, along with source and destination information for routing the packets. Specific examples for PCIe packets include the Fmt field and the Type field of the TLP header which indicate a transaction type. An address field comprises a memory space address or I/O address within a target device or function to which the transaction is directed, such as an address for a read/write transaction. The header can also include a TLP tag, which is used primarily in read transactions to correlate read requests to later read data responses in the requester. The TLP tag transferred in a read request packet can become the completer ID for a transaction in a read response packet. Typically, this TLP tag is a transaction-specific or unique value so as to maintain data coherency among read transactions. Notably, the packet header includes several components that identify the entity which issued the packet(s), namely the requester identifier (ID) denoted by a combination of the bus, device, and function fields in the packet header.

Packet detect element 415 prompts further processing of packets by trigger monitors 416 which perform various types of actions based on the transaction types of packets. These actions are described in FIG. 2, such as to prompt storage of different types of packet or transaction information based on the transaction types (e.g. configuration transactions, interrupt transactions, memory transactions, I/O transactions). Trace data handler 418 produces trace files which comprise waveforms and activity information of monitored devices. This trace file might comprise all traffic in a packet format organized by time of receipt by FPGA 410. Various filters can be established as discussed herein to ignore traffic or transactions of a certain type or for designated devices, while capturing packets or transaction properties for other transaction types or selected devices. Trace files or trace data can be provided by trace data handler 418 over links 425-426 for delivery to one or more external devices through FPGA interface 422 or PCIe interface 421. In one example, trace data handler 418 (or similar elements in FPGA 430) can transfer trace files or trace data to computing module 450 over the PCIe interfaces and links in FIG. 4 as well as PCIe switch 440.

Trace data handler 418 can also be employed to establish transaction metadata. Transaction metadata can be used to correlate transaction portions or packets in trace files and mark, tag, or otherwise label these transaction portions or packets for easier identification as being a part of the same transaction or set of transactions, especially when transaction portions or packets are separated in time and may have many intervening packets or transaction portions of other transactions unrelated to the targeted transactions. Moreover, the transaction metadata and trace data can aid in linking transaction portions or packets as part of the same transaction or set of transactions across the uplink and downlink monitoring.

Specifically, transaction metadata or other transaction properties can be transferred over inter-FPGA link 466 between FPGA 410 and FPGA 430. In one example, FPGA 410 is configured to monitor first packets among traffic carried by one or more first directional lanes of a communication link, such as downlink lanes carried by link 480, established between a host and one or more endpoint devices and determine header information for the first packets. FPGA 410 can transfer header information to FPGA 430. FPGA 430 can be configured to detect second packets among traffic carried by one or more second directional lanes of the communication link, such as uplink lanes carried by link 481, based at least in part on the header information determined for the first packets.

In one example, trace data handler 418 (or similar elements in FPGA 430) can be configured to establish transaction metadata comprising properties of transactions on the communication link based at least on correlations among the first packets monitored by FPGA 410 and the second packets monitored by FPGA 430. In further examples, trace files or data are provided to computing module 450 over the PCIe interfaces and links in FIG. 4 as well as PCIe switch 440. Computing module 450 can then determine transaction metadata comprising properties of transactions on the communication link based at least on correlations among the first packets monitored by FPGA 410 and the second packets monitored by FPGA 430.

In another example, an NVMe read might be monitored for in packets transferred over a communication bus. FPGA 410 can identify a read request transaction type on a downlink side of the bus and responsively assign a unique transaction metadata label. FPGA 410 can then pass one or more indicators, such as a BDF information, a requestor ID, or a TLP tag of the read request to FPGA 430 for monitoring of the uplink side of the communication bus. FPGA 410 can also transfer the transaction metadata label to FPGA 430 which is indicated as correlated with the BDF, requestor ID, or TLP tag. FPGA 430 can monitor packets for one or more completion packets of a read transaction on the uplink side using the requestor ID and/or TLP tag provided by FPGA 410. FPGA 430 can then add the transaction metadata label to be applied to transaction trace data or trace files for the completion packets.

Thus, when the trace files or trace data determined by FPGA 410 is compared or assembled with the trace files or trace data determined by FPGA 430, the transaction metadata labels can be employed to group transaction portions together—such as read request packets with the associated completion packets, among other types of transactions. The transaction metadata label advantageously allows labeling and tracking of transactions or transaction portions split over packets of downlink/uplink lanes (or exclusive to one lane and transferred over more than one part or set of packets) without post processing. This can help better detect and monitor bus traffic that is interleaved with other transactions, with other devices/functions, and provided for more effective sorting, filtering, triggering, and identification of traffic. When transaction metadata labels are applied within FPGA 410 or FPGA 430, these circuits can filter new traffic using the transaction metadata labels or with associated BDF properties to prevent storage of irrelevant or unwanted bus monitoring data. Moreover, triggers can be applied using transaction metadata label and associated BDF properties to detect traffic on the downlink or uplink lanes. Furthermore, when the transaction metadata label is applied to trace data or trace files that are provided to computing module 450, easier sorting, filtering, parsing, and handling of captured bus transaction data can be provided. When presented to users via various user interfaces, computing module 450 can employ transaction metadata labels to only show transactions of particular devices, functions, or according to any properties tied to a particular transaction metadata label.

Trace data handler 418 might process a large quantity of packets and associated data for transactions over short periods of time, due in part to the high-speed nature of PCIe interfaces. Also, when multi-device PCIe links are employed, such as when PCIe switches are employed, then trace data can grow quickly. Some trace data might be stored within FPGA 410, such as in block ram (BRAM) 420 over link 423. However, BRAM 420 can be limited in space due to physical size and layout constraints of FPGA 410. In FIG. 4, DRAM 470 can be employed to hold trace data, trace files, transaction metadata, and other information related to packets, headers, and transactions. DRAM 470 can be accessed over memory interface 419 of FPGA 410 and link 468. FPGA 430 includes a similar arrangement with regard to memory interface 434, memory link 467, and DRAM 471. Advantageously, DRAM 470-471 can be expanded to meet the needs of increased traffic monitoring and analysis performed by FPGAs 410 and 430.

Archive element 417 can include information for replicated 'spaces' for PCIe devices or functions, such as configuration spaces, memory address spaces, I/O spaces, interrupt address spaces, and the like. This space information can be assembled over time by monitoring bus activity for devices, segregated among devices/functions and stored in corresponding data structures. Configuration space information includes capabilities of devices, and might be a replicated version of the first 16 DWORDS (registers) of the configuration space maintained by one or more monitored devices. Interrupts can also be monitored and an address space for interrupts determined and maintained in a table or other data structure. BRAM 420 can be employed to store this space information, as well as to store base address register (BAR) properties and related information for devices/functions. Archive element 417 can provide the space information or other related information to one or more external devices, such as computing module 450 over the PCIe interfaces and links in FIG. 4 as well as PCIe switch 440.

Computing module 450 can receive various transaction data over PCIe link 461 to store, archive, further transfer the transaction data. This transaction data can take the form of trace files, replicated space information in one or more data structures, captured packets in their entirety, or other information monitored for the target communication buses. When transferred to other systems, computing module 450 can employ one or more communication interfaces, such as network interfaces, for transferring this transaction data. Computing module 450 can establish one or more graphical, textual, or network user interfaces indicating the captured transaction data in the form of packets, headers, and timing information. Transaction metadata labels can be used to mark transactions of note, trigger based on criteria provided by users, receive filter instructions and apply the filters to raw data. User input can be received by user interfaces of computing module 450 to provide filter information and trigger criteria to FPGAs 410 and 430 which can perform low-level TLP triggering or filtering of transactions based on monitored packets. The user input can also be employed to assign transaction metadata labels to viewed transactions or packets. Computing module 450 can indicate the transaction metadata labels and corresponding transaction or packet properties to FPGAs 410 and 430 for marking of packets of transactions at the TLP level.

Figure 5:
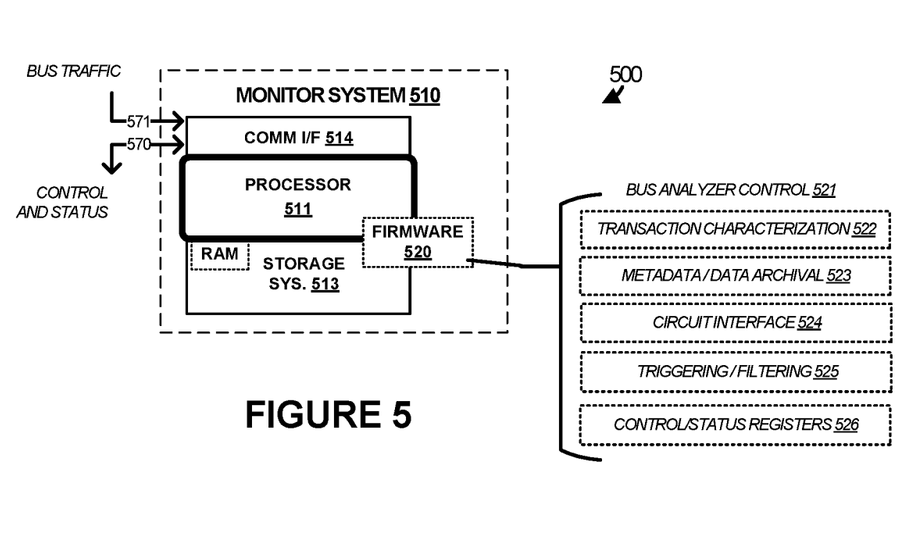
FIG. 5 illustrates a control system in an implementation.

FIG. 5 illustrates monitor system 510 that is representative of any system or collection of systems from which the various analysis, monitoring, detection, triggering, filtering, and archiving operations for PCIe traffic or other interfaces can be directed. In one implementation, monitor system 510 is representative of at least analysis system 140 of FIG. 1, portions of the FPGAs of monitor system 400 of FIG. 4, or computing module 450 of FIG. 4.

Monitor system 510 may be implemented as a single apparatus, system, or device or may be implemented in a distributed manner as multiple apparatuses, systems, or devices. Monitor system 510 includes, but is not limited to, processor 511, storage system 513, communication interface system 514, and firmware 520. Processor 511 is operatively coupled with storage system 513 and communication interface system 514.

Processor 511 loads and executes firmware 520 from storage system 513. Firmware 520 includes bus analyzer control 521, which is representative of the processes discussed with respect to the preceding Figures. When executed by processor 511 to provide enhanced analysis, monitoring, detection, triggering, filtering, and archiving operations for PCIe traffic or other interfaces, firmware 520 directs processor 511 to operate as described herein for at least the various processes, operational scenarios, and sequences discussed in the foregoing implementations. Monitor system 510 may optionally include additional devices, features, or functionality not discussed for purposes of brevity.

Referring still to FIG. 5, processor 511 may comprise a microprocessor and processing circuitry that retrieves and executes firmware 520 from storage system 513. Processor 511 may be implemented within a single processing device, but may also be distributed across multiple processing devices, sub-systems, or specialized circuitry, that cooperate in executing program instructions and in performing the operations discussed herein. Examples of processor 511 include general purpose central processing units, application specific processors, and logic devices, as well as any other type of processing device, combinations, or variations thereof.

Storage system 513 may comprise any computer readable storage media readable by processor 511 and capable of storing firmware 520. Storage system 513 may include volatile and nonvolatile, removable and non-removable media implemented in any method or technology for storage of information, such as computer readable instructions, data structures, program modules, or other data. Examples of storage media include random access memory (RAM), read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 513 may also include computer readable communication media over which at least some of firmware 520 may be communicated internally or externally. Storage system 513 may be implemented as a single storage device, but may also be implemented across multiple storage devices or sub-systems co-located or distributed relative to each other. Storage system 513 may comprise additional elements, such as a controller, capable of communicating with processor 511 or possibly other systems.

Firmware 520 may be implemented in program instructions and among other functions may, when executed by processor 511, direct processor 511 to operate as described with respect to the various operational scenarios, sequences, and processes illustrated herein. For example, firmware 520 may include program instructions for providing enhanced analysis, monitoring, detection, and archiving operations for PCIe traffic or other interfaces, among other operations.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Firmware 520 may include additional processes, programs, or components, such as operating system software or other application software, in addition to that of bus analyzer control 521. Firmware 520 may also comprise program code, scripts, macros, and other similar components. Firmware 520 may also comprise software or some other form of machine-readable processing instructions executable by processor 511.

In general, firmware 520 may, when loaded into processor 511 and executed, transform a suitable apparatus, system, or device (of which monitor system 510 is representative) overall from a general-purpose computing system into a special-purpose computing system customized to facilitate analysis, monitoring, detection, triggering, filtering, and archiving operations for PCIe traffic or other interfaces. Encoding firmware 520 on storage system 513 may transform the physical structure of storage system 513. The specific transformation of the physical structure may depend on various factors in different implementations of this description. Examples of such factors may include, but are not limited to, the technology used to implement the storage media of storage system 513 and whether the computer-storage media are characterized as primary or secondary storage, as well as other factors.

For example, if the computer readable storage media are implemented as semiconductor-based memory, firmware 520 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Bus analyzer control 521 can include one or more software elements, such as an operating system, devices drivers, and one or more applications. These elements can describe various portions of monitor system 510 with which bus interfacing circuitry, bus analysis elements, traffic archiving elements, triggering elements, filtering elements, or other elements interact. For example, an operating system can provide a software platform on which bus analyzer control 521 is executed and allows for enhanced analysis, monitoring, detection, triggering, filtering, and archiving operations for PCIe traffic or other interfaces, among other operations.

In one example, transaction characterization 522 receives indications or information on bus activity or communication traffic carried by a monitored communication link. This communication link is typically interfaced physically via various circuitry and logic, such as bus splitter circuitry and logic to decode traffic. Circuit interface 524 can interface with this circuitry to receive monitored information or to provide traffic triggering/filtering information to this circuitry. The information or indications on bus activity can be received over link 571, which might comprise one or more logical interfaces, physical interfaces, application programming interfaces, or software interfaces, among other interfaces. Control of bus splitter circuitry, traffic decoding circuitry, or similar circuitry can be communicated with via one or more links represented by link 570.

Information monitored by transaction characterization 522 might comprise first packets monitored by a first circuit that monitors first lanes of a communication link, and second packets monitored by a second circuit that monitors second lanes of the communication link. From these packets or related information, transaction characterization 522 can determine header information for the packets, such as BDF information and addressing information from which transaction types can be determined, among other information. Transaction characterization 522 can also identify when traffic meets one or more triggering or filtering criteria, which can be defined by triggering/filtering 525. Transaction characterization 522 can provide information from the packets or determined information to metadata/data archival 523 for handling by one or more processes that act upon transaction types to archive information about the packets, determine various characteristics or properties for the traffic including configuration space information, address space information, higher-level protocol information, and interrupt information. Metadata features of metadata/data archival 523 can include determining tags that identifies traffic of particular transactions which might be composed of uplink and downlink traffic.

Control/status registers 526 include one or more non-volatile memory elements which provide status of the operation of monitor system 510 to external elements and system over link 570 or other links. Control over the operations of control/status registers 526 can also occur via modification or alteration of values stored within control/status registers 526, or of logic-coupled ones of control/status registers 526 which tie to operation of monitor system 510. Reads/writes of ones of control/status registers 526 can occur over link 570 from one or more external systems. Various example control registers might include user entered configuration information for devices, user defined triggers or traffic filters, as well as various identification information comprising serial numbers, model numbers, version numbers, and related information for both hardware and software elements.

Communication interface system 514 may include communication connections and devices that allow for communication over links 570 to communicate with FPGAs, ASICs, bus splitters, memory devices, storage devices, network devices, or with external systems (not shown in FIG. 5) over one or more communication networks (not shown). Examples of connections and devices that together allow for inter-system communication may include discrete control links, system management buses, serial control interfaces, register programming interfaces, network interface cards, antennas, power amplifiers, RF circuitry, transceivers, and other communication circuitry. The connections and devices may communicate over communication media to exchange packetized communications with other computing systems or networks of systems, such as metal, glass, air, or any other suitable communication media. Communication interface system 514 may include user interface elements, such as programming registers, control/status registers 526, APIs, or other user-facing control and status elements.

Communication between monitor system 510 and other circuitry and systems (not shown in FIG. 5), may occur over links 570-571 comprising one or more communication links or communication networks, and in accordance with various communication protocols, combinations of protocols, or variations thereof. These other systems can include bus interface circuitry, bus splitter circuitry, FPGAs, and ASICs, among others. Communication interfaces might comprise PCIe interfaces, Ethernet, system management bus (SMBbus) interfaces, inter-integrated circuit (I2C) interfaces, or other similar interfaces. Further examples include intranets, internets, the Internet, local area networks, wide area networks, storage area networks, wireless networks, wired networks, virtual networks, software defined networks, data center buses, computing backplanes, or any other type of network, combination of network, or variation thereof. Some example communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:
1. An apparatus, comprising:
    a first circuit configured to monitor first packets among traffic carried by one or more first directional lanes of a communication link established between a host hav- ing a root complex and one or more endpoint devices and determine header information for the first packets, wherein the communication link carries packets in a higher-level protocol over an underlying protocol and wherein the header information determined for the first packets comprises bus-device-function (BDF) properties;

a second circuit configured to detect second packets among traffic carried by one or more second directional lanes of the communication link based at least in part on the header information determined for the first packets; and an analysis element processor configured to establish transaction metadata comprising properties of transactions on the communication link based at least on correlations among the first packets and the second packets, wherein the transaction metadata comprises transaction tags that organize individual transactions monitored on the communication link, associated endpoint addresses, transaction types, and the BDF properties.

2. The apparatus of claim 1, comprising:
the analysis element processor configured to determine the endpoint addresses associated with the transactions based at least on the correlations among the first packets and the second packets.

3. The apparatus of claim 1, comprising:
the analysis element processor configured to establish one or more traffic filters based on the transaction tags and provide indications of the one or more traffic filters to the second circuit for filtering portions of the traffic carried by the one or more second directional lanes in accordance with BDF properties specified by the one or more traffic filters.

4. The apparatus of claim 3, wherein filtering the portions of the traffic comprises at least one among:
capturing information for first traffic associated with a designated endpoint device and ignoring second traffic associated with undesignated endpoint devices; and
capturing information for first traffic having targeted BDF properties and ignoring second traffic having un-targeted BDF properties.

5. The apparatus of claim 1, wherein the analysis element processor is configured to:
determine at least transaction types for the transactions based at least in part on the header information determined for the first packets and further information detected for the second packets;
trigger one or more analysis or logging operations for the transactions based on the transaction types, wherein the transaction types each comprise one among a memory transaction, an input/output transaction, a configuration transaction, and an interrupt transaction; and
based on the transaction types indicating configuration transactions, establish at least a partially replicated configuration space indicating capabilities of the one or more endpoint device based on one or more configuration transactions detected using the correlations among the first packets and the second packets, wherein the transaction metadata comprises traffic history organized by transaction identifiers that establish the at least partially replicated configuration space.

6. The apparatus of claim 5, comprising:
based on the transaction types indicating interrupt transactions, the analysis element processor configured to establish at least a partially replicated interrupt address space of the one or more endpoint device based on one or more interrupt transactions detected using the correlations among the first packets and the second packets, wherein the transaction metadata comprises traffic history organized by transaction identifiers that establish the at least partially replicated interrupt address space.

7. The apparatus of claim 1, comprising:
a first analog splitter circuit configured to couple onto the one or more first directional lanes of the communication link between the one or more endpoint devices and the host and provide replicas of the one or more first directional lanes to the first circuit;
a second analog splitter circuit configured to couple onto the one or more second directional lanes of the communication link between the one or more endpoint devices and the host and provide replicas of the one or more second directional lanes to the second circuit;
the first circuit comprising a first field programmable gate array (FPGA) coupled to the replicas of the one or more first directional lanes and having a first interface configured to couple to the second circuit over an intermediate link, wherein the intermediate link carries at least the information determined for the first packets; and
the second circuit comprising a second FPGA coupled to the replicas of the one or more second directional lanes and having a second interface configured to couple to the first circuit over the intermediate link.

8. The apparatus of claim 1, wherein the communication link comprises a peripheral component interconnect express (PCIe) communication link.

9. The apparatus of claim 1, wherein the higher-level protocol comprises NVM Express (NVMe) communications.

10. A data bus analysis system, comprising:
one or more computer readable storage media; and
program instructions stored on the one or more computer readable storage media that, based on being read and executed by a processing system, direct the processing system to at least:
monitor first packets among traffic carried by one or more first directional lanes of a communication link established between a host having a root complex and one or more endpoint devices and determine header information for the first packets, wherein the communication link carries packets in a higher-level protocol over an underlying protocol and wherein the header information determined for the first packets comprises bus-device-function (BDF) properties;
detect second packets among traffic carried by one or more second directional lanes of the communication link based at least in part on the header information determined for the first packets; and
establish transaction metadata comprising properties of transactions on the communication link based at least on correlations among the first packets and the second packets, wherein the transaction metadata comprises transaction tags that organize individual transactions monitored on the communication link, associated endpoint addresses, transaction types, and the BDF properties.

11. The data bus analysis system of claim 10, comprising further program instructions, based on being executed by the processing system, direct the processing system to at least:
determine the endpoint addresses associated with the transactions based at least on the correlations among the first packets and the second packets.

12. The data bus analysis system of claim 10, comprising further program instructions, based on being executed by the processing system, direct the processing system to at least:
establish one or more traffic filters based on the transaction tags and provide indications of the one or more traffic filters for filtering portions of the traffic carried by the one or more second directional lanes in accordance with BDF properties specified by the one or more traffic filters.

13. The data bus analysis system of claim 12, wherein filtering the portions of the traffic comprises at least one among:
capturing information for first traffic having targeted BDF properties and ignoring second traffic having un-targeted BDF properties; and
capturing information for first traffic associated with a designated endpoint device and ignoring second traffic associated with undesignated endpoint devices.

14. The data bus analysis system of claim 10, comprising further program instructions, based on being executed by the processing system, direct the processing system to at least:
determine at least transaction types for the transactions based at least in part on the header information determined for the first packets and further information detected for the second packets;
trigger one or more analysis or logging operations for the transactions based on the transaction types, wherein the transaction types each comprise one among a memory transaction, an input/output transaction, a configuration transaction, and an interrupt transaction; and
based on the transaction types indicating configuration transactions, establish at least a partially replicated configuration space indicating capabilities of the one or more endpoint device based on one or more configuration transactions detected using the correlations among the first packets and the second packets, wherein the transaction metadata comprises traffic history organized by transaction identifiers that establish the at least partially replicated configuration space.

15. The data bus analysis system of claim 14, comprising further program instructions, based on being executed by the processing system, direct the processing system to at least:
based on the transaction types indicating interrupt transactions, establish at least a partially replicated interrupt address space of the one or more endpoint device based on one or more interrupt transactions detected using the correlations among the first packets and the second packets, wherein the transaction metadata comprises traffic history organized by transaction identifiers that establish the at least partially replicated interrupt address space.

16. The data bus analysis system of claim 10, wherein the communication link comprises a peripheral component interconnect express (PCIe) communication link.

17. The data bus analysis system of claim 10, wherein the higher-level protocol comprises NVM Express (NVMe) communications.

18. A method, comprising:
monitoring first packets among traffic carried by one or more first directional lanes of a communication link established between a host and one or more endpoint devices and determine header information for the first packets, wherein the header information determined for the first packets comprises bus-device-function (BDF) properties;
detecting second packets among traffic carried by one or more second directional lanes of the communication link based at least in part on the header information determined for the first packets; and
establishing transaction metadata comprising properties of transactions on the communication link based at least on correlations among the first packets and the second packets, wherein the transaction metadata comprises transaction tags that organize individual transactions monitored on the communication link, associated endpoint addresses, transaction types, and the BDF properties.

19. The method of claim 18, further comprising:
determining at least transaction types for the transactions based at least in part on the header information determined for the first packets and further information detected for the second packets;
triggering one or more analysis or logging operations for the transactions based on the transaction types, wherein the transaction types each comprise one among a memory transaction, an input/output transaction, a configuration transaction, and an interrupt transaction;
based on the transaction types indicating configuration transactions, establishing at least a partially replicated configuration space indicating capabilities of the one or more endpoint device based on one or more configuration transactions detected using the correlations among the first packets and the second packets, wherein the transaction metadata comprises traffic history organized by the transaction tags that establish the at least partially replicated configuration space; and
based on the transaction types indicating interrupt transactions, establishing at least a partially replicated interrupt address space of the one or more endpoint device based on one or more interrupt transactions detected using the correlations among the first packets and the second packets, wherein the transaction metadata comprises traffic history organized by the transaction tags that establish the at least partially replicated interrupt address space.

20. The method of claim 18, wherein the communication link comprises a peripheral component interconnect express (PCIe) communication link; and
wherein the PCIe communication link carries packets in a higher-level protocol over an underlying PCIe protocol.

21. An apparatus, comprising:
a first circuit configured to monitor first packets among traffic carried by one or more first directional lanes of a communication link established between a host having a root complex and one or more endpoint devices and determine header information for the first packets, wherein the communication link carries packets in a higher-level protocol over an underlying protocol;
a second circuit configured to detect second packets among traffic carried by one or more second directional lanes of the communication link based at least in part on the header information determined for the first packets; and
an analysis element processor configured to:
establish transaction metadata comprising properties of transactions on the communication link based at least on correlations among the first packets and the second packets;
determine at least transaction types for the transactions based at least in part on the header information determined for the first packets and further information detected for the second packets;
trigger one or more analysis or logging operations for the transactions based on the transaction types, wherein the transaction types each comprise one among a memory transaction, an input/output transaction, a configuration transaction, and an interrupt transaction; and based on the transaction types indicating configuration transactions, establish at least a partially replicated configuration space indicating capabilities of the one or more endpoint device based on one or more configuration transactions detected using the correlations among the first packets and the second packets, wherein the transaction metadata comprises traffic history organized by transaction identifiers that establish the at least partially replicated configuration space.

22. A data bus analysis system, comprising:

one or more computer readable storage media; and program instructions stored on the one or more computer readable storage media that, based on being read and executed by a processing system, direct the processing system to at least:

monitor first packets among traffic carried by one or more first directional lanes of a communication link established between a host having a root complex and one or more endpoint devices and determine header information for the first packets, wherein the communication link carries packets in a higher-level protocol over an underlying protocol;

detect second packets among traffic carried by one or more second directional lanes of the communication link based at least in part on the header information determined for the first packets; and establish transaction metadata comprising properties of transactions on the communication link based at least on correlations among the first packets and the second packets;

determine at least transaction types for the transactions based at least in part on the header information determined for the first packets and further information detected for the second packets;

trigger one or more analysis or logging operations for the transactions based on the transaction types, wherein the transaction types each comprise one among a memory transaction, an input/output transaction, a configuration transaction, and an interrupt transaction; and based on the transaction types indicating configuration transactions, establish at least a partially replicated configuration space indicating capabilities of the one or more endpoint device based on one or more configuration transactions detected using the correlations among the first packets and the second packets, wherein the transaction metadata comprises traffic history organized by transaction identifiers that establish the at least partially replicated configuration space.

* * * * *